United States Patent
Chaudhuri et al.

(10) Patent No.: US 6,212,526 B1
(45) Date of Patent: *Apr. 3, 2001

(54) METHOD FOR APPARATUS FOR EFFICIENT MINING OF CLASSIFICATION MODELS FROM DATABASES

(75) Inventors: Surajit Chaudhuri, Redmond; Usama Fayyad, Mercer Island, both of WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/982,760

(22) Filed: Dec. 2, 1997

(51) Int. Cl.$^7$ ........................................... G06F 17/30
(52) U.S. Cl. ........................... 707/102; 707/100; 707/101
(58) Field of Search ..................... 707/1–10, 100–104, 707/200–206; 711/100

(56) References Cited

U.S. PATENT DOCUMENTS

| | | | |
|---|---|---|---|
| 5,787,274 | * 7/1998 | Agrawal et al. | 707/102 |
| 5,799,311 | * 8/1998 | Agrawal et al. | 707/102 |
| 5,870,735 | * 2/1999 | Agrawal et al. | 707/3 |

OTHER PUBLICATIONS

*SLIQ: A Fast Scalable Classifier for Data Mining*, EDBT Conferencce, Mehta, Manish, Agrawal, Rakesh and Rissanen, Jorma. (1996).

From Digitized Images to Online Catalogs. *AI Magazine*, pp. 51–66, Fayyad, Usama M., Djorgovski, S.G. and Weir, Nicholas, (Summer 1996).

*Data Mining and Knowledge Discovery: Making Sense Out of Data*, Fayyad, Usama M. Submitted to IEEE Expert, for publication in the special issue on Data Mining (Aug., 1996).

Panning for Data Gold, *New Scientist*. No. 2031, Weekly E1–80, pp. 31–33 (May 25, 1996).

Automating the Analysis and Cataloging of Sky Surveys, Advances in Knowledge Discovery and Data Mining, Chapter 19, pp. 471–493, Fayyad, Usama M., Djorgovski, S. George and Weir, Nicholas, AAAI Press/The MIT Press, Menlo Park, California; Cambridge, MA; London, England (1996).

* cited by examiner

*Primary Examiner*—Ruay Lian Ho
(74) *Attorney, Agent, or Firm*—Watts, Hoffmann, Fisher & Heinke, Co., L.P.A.

(57) ABSTRACT

Method and apparatus for the construction of a classification model (for example a decision tree) from data in a large database. The database is stored in the form of data records on a storage medium for access by a computer. The computer executes a software component for building a classification model from the data in the database. The classification building component has a scheduler that directs the computer to sequentially access all records in the database one or more times as required for extracting the necessary sufficient statistics to construct the classification model. The method optimizes the construction of the classifier from the database by minimizing the number of database scans and making as much use of the computer's fast main memory (RAM) as possible. The method prescribes three different modes for scanning data and includes a scheduler component that decides which of these modes to employ and on what parts of the database. During the generation of a classification model from the database, the number of active data records is reduced on subsequent scans. As the number of records that must be accessed to construct the classifier is reduced, the scheduler switches from sequential access of all records in the database to indexed access of a subset of records within the database to complete the building of the classifier. As record subset sizes decrease to the point where a subset now fits in the computer's RAM, the scheduler ultimately switches to loading the data subset and performing all subsequent processing in-memory.

9 Claims, 5 Drawing Sheets

METHOD FOR APPARATUS FOR EFFICIENT MINING OF CLASSIFICATION MODELS FROM DATABASES

FIELD OF THE INVENTION

The present invention concerns building classification models (also called classifiers) from a large database having records stored on a mass storage device (database system).

BACKGROUND ART

Computer database software stores data records in tables. A database is a set of tables of data along with information about relations between these tables. Tables represent relations over the data and consist of one or more fields (sometimes called columns). A set of records make up a table in a database. The contents of a database are extracted and/or manipulated using a query language that is supported by the database software. Current query languages support the extraction of information that is well-specified (e.g. via a SQL query or a logical specification of a subset of the data contained in the database). To retrieve data from the database, one must specify an exact description of the desired target data set.

One important use of database technology is to help individuals and organizations make decisions based on the data contained in the database. Decision support information varies from the well-specified (e.g. give me a report of sales by store over an exactly specified period of time) to the not-so-well specified (e.g. find me records in the data that are "similar" to records in table A but "dissimilar" from records in table B). In this case, the target set is not specified via an exact query, but is specified implicitly by labeling (or tagging) records in the data (e.g. these records are to be tagged 'A' and these others are to be tagged 'B'). This is an example of a classification task. Classification tasks are one of the activities used in the area of decision support, data analysis, and data visualization. Given an existing database containing records, one is interested in predicting the values of some target fields (also called variables) based on the values of other fields (variables) in the database.

As an example, a marketing company may want to decide whom to target for an ad campaign based on historical data about a set of customers and how they responded to previous ad campaigns. In this case, there is one field being predicted: the field in the database that indicates whether a customer responded to a previous campaign—call it "response field". The fields used to predict the response field (and hence to classify records) are other fields in the database. For example: age of customer, whether customer owns a vehicle, presence of children in household, and so forth. Other examples where classification over a database is useful include fraud detection, credit approval, diagnosis of system problems, diagnosis of manufacturing problems, recognition of signatures in signals or object recognition in image analysis.

MOTIVATION FOR INVENTION

Using human experts such as statisticians or domain experts (such as data analysts, engineers, or marketing experts) to build classifiers based on existing data is expensive and may not be accurate especially for problems involving large data sets that have a multitude of fields. Even trained scientists can fail in the search for reliable classifiers when the problem is one where the data records have many fields (i.e. the dimensionality of the data is high) and there are a large number of records. An illustrative example of this problem in the case of classifying objects in an astronomical survey database (deciding if a sky object is a star or galaxy) is given in [Fayyad et al 1996]. In that example, a classifier was automatically constructed based on a data table that had 40 fields. Notably, trained scientists were not able to solve this problem effectively. Techniques for building classification models (classifiers) from data automatically have appeared in the pattern recognition, statistics, and computer science literature.

[Fayyad et al 1996] U. M. Fayyad, S. G. Djorgovski, and N. Weir "Automating the Analysis and Cataloging of Sky Surveys", a chapter in *Advances in Knowledge Discovery and Data Mining*, U. Fayyad et al (Eds.), pp.471–493, MIT Press (1996).

Historically, the methods presented in the literature and implemented in statistical analysis packages do not scale to large data sets. Such methods assume that data can be loaded in the main memory of the computer system and manipulated conveniently in RAM to build a classification model. If the data in question happens to be larger than what can be held in core memory (RAM), the classification software's performance rapidly deteriorates and in many cases the process terminates if one runs out of virtual memory. One goal of the present invention is an automated means of classifying data that can be used on large databases. Notably, the performance of the classification method defined in this invention does not deteriorate if data cannot fit in memory since the invention exploits awareness that data is too large to fit in memory and is hence resident on disk and should be carefully accessed through the database management system (DBMS).

With the growth and proliferation of databases (and now data warehouses) into almost every aspect of activity in organizations: business, science, personal, and government, the need has grown for automated tools to help analyze, visualize, and summarize the contents of large databases. These techniques are sometimes referred to as data mining techniques. Data mining techniques allow for the possibility of computer-driven exploration of the data. This opens up the possibility for a new way of interacting with databases: specifying queries at a much more abstract level than SQL permits. It also facilitates data exploration for problems that, due to high-dimensionality, would otherwise be very difficult for humans to explore, regardless of difficulty of use of, or efficiency issues associated with, SQL.

While DBMS developments have focused on issues of efficiently executing a query once it has been formulated, little attention has been given to the effort needed to formulate queries in the first place. Decision support type queries are typically difficult to formulate. The basic problem is: how can we provide access to data when the user does not know how to describe the goal in terms of a specific query? Examples of this situation are fairly common in decision support situations. One example is a credit card or telecommunications company that would like to query its database of usage data for records representing fraudulent cases. Another example would be a scientist dealing with a large body of data who would like to request a catalog of events of interest appearing in the data. Such patterns, while recognizable by human analysts on a case by case basis, are typically very difficult to describe in a SQL query or even as a computer program in a stored procedure. Often the domain expert does not even know what variables influence the classification problem of interest, but data about past occurrences may be plentiful. A more natural means of interacting with the database is to state the query by example. In this case, the analyst would label a training set of examples of cases of one class versus another and let the data mining system build a model for distinguishing one class from another. The system can then apply the extracted classifier to search the full database for events of interest or to classify future cases as they arrive. This approach is typically much more feasible than detailed modeling of the causal mechanisms underlying the phenomena because examples are usually easily available, and humans find it natural to interact at the level of labeling cases. Also, it is often only possible to obtain a label (class) for a case in retrospect (e.g. fraud).

The difficulty in building classification models manually derives from the fact that humans find it particularly difficult to visualize and understand a large data set. Data can grow along two dimensions: the number of fields (also called dimensions or attributes) and the number of cases. Human analysis and visualization abilities do not scale to high-dimensions and massive volumes of data. A standard approach to dealing with high-dimensional data is to project it down to a very low-dimensional space and attempt to build models in this simplified subspace. As the number of dimensions grows, the number of choice combinations for dimensionality reduction explodes. Furthermore, a projection to lower dimensions could easily transform an otherwise solvable discrimination problem (classification problem) into one that is impossible to solve. If the human analyst is trying to explore models, then it becomes infeasible to go through the various ways of projecting the dimensions or selecting the right subsamples (reduction along columns and rows of the target database). An effective means to visualize data would be to employ data mining methods (e.g. classification) to perform the appropriate reductions.

Another factor that is turning data mining into a necessity is that the rates of growth of data sets exceeds by far any rates that traditional "manual" analysis techniques can cope with. If the goal is to utilize the data in a timely manner, it will be necessary to go beyond traditional manual data analysis approaches, for which most of the data usually remain unused. Such a scenario is not realistic in any competitive environment where others who do utilize data resources better will gain a distinct advantage. This sort of pressure is present in a wide variety of organizations, spanning the spectrum from business, to science, to government.

For the reasons cited above, using standard database query languages (such as SQL) to build classification models can be very slow and ineffective. Queries aimed at projecting data down to lower dimensions often leave the analyst without any clue of where to proceed. It is one object of the present invention to make the creation of classifiers from large database more efficient.

Table 1 depicted below illustrates the makeup of the data records of a database. Each of the records has a number of attributes or fields, Attr_1, Attr_2 . . . Attr_m and includes an attribute or field that is labeled 'class'. 'Class' is the target attribute whose value is to be predicted based on other attributes. In a classical (non-scalable) setting, assume that this data table (Table 1) is loaded in core memory (RAM) of the computer. This assumption is for illustration purposes and in this invention we will show how such an assumption can be dropped effectively.

TABLE 1

Data_Table

| CaseID | Attr_1 | Attr_2 | . . . | Attr_m | Class |
|--------|--------|--------|-------|--------|-------|
| ICase 1 | V_1j | V_1k | . . . | V_ml | Ci |
| ICase 2 | V_1i | V_2l | . . . | V_mk | Cj |
| . . . | . . . | . . . | . . . | . . . | . . . |
| ICase N | V_1q | V_2r | . . . | V_ms | Ck |

In Table 1, the last attribute under the heading 'Class' corresponds to the variable the desired classifier should predict. The first attribute in the table under the heading 'CaseID' is a key indexed field for the records in the table. The data need not be represented in the database in the scheme of Table 1. We assume that some query maps it to this table prior to beginning the classification.

An illustrative example of a database for building a classifier contains data describing operations of a large number of retail stores that are located throughout the country. A representative sample data for such a database is listed below in Table 2.

TABLE 2

| CaseID | Store-Type | Region | . . . | Location-type | Season | Profitable (Class) |
|--------|------------|--------|-------|---------------|--------|--------------------|
| record1 | Shoes | Midwest | . . . | Urban | Summer | Average |
| record2 | Elecs | West | . . . | Mall | Christmas | VeryProf |
| record3 | Misc | Nwest | . . . | Mall | Fall/School | BreakEven |
| . . . | . . . | . . . | . . . | . . . | . . . | . . . |
| recordN | Shoes | Neast | . . . | StripMall | Summer | Losing |

The goal is to build a model classifier to predict class values based on the other attributes of table 2. Such a classifier may be used to identify a set of factors that can be used in locating a store of a particular type that will produce high profits without the need to actually set up a store to gain operating data.

SUMMARY OF THE INVENTION

The present invention concerns a structure and method for constructing classification models from a database and more particularly a large database of records that cannot be evaluated in the core memory (RAM) of a computer as is done by traditional computational approaches for building classification models. The term data mining is sometimes used to describe the evaluation and extraction of classification information from such large databases.

A illustrative embodiment of the present invention uses a decision tree to build the classification model. Each non-leaf node on the tree is a decision node that defines a branch predicate that specifies a subset of the complete data set. Thus each child node of a decision node has associated with it a set of record that are a subset of the records associated with the parent node. Each leaf node has associated with it a classification prediction: a prediction of what values of the class variable are to be found at the leaf. This prediction can be probabilistic, i.e. for each value of the class variable, an associated probability of that value is given. Hence classification is a vector of probabilities whose size is the number of values of the class.

Note that prior art algorithms for building decision trees assumes that data is in memory and hence it "moves" cases from one node in the growing decision tree to new children node. This invention shows how to build a decision tree without data necessarily being in RAM. In accordance with one embodiment of the present invention, a database containing a large number of records that are stored on a storage medium is evaluated by scanning records in the database and constructing a classification model based on the sufficient statistics derived from scanning the contents of the database. We will use the term sufficient statistics to refer to the necessary statistical information needed to drive the classification model building process. Sufficient statistics can have many forms including a sample of the data, counts of correlations in the data, a set of statistical moments of the data, and so forth. The sufficient statistics represent the basic information needed to drive the algorithm to build a classification model. Hence, if the algorithm has access to the sufficient statistics, it has no need to access the data directly.

The goal is to build the classification model in as few scans of the database as possible. Clearly, if one can simply load data into memory, then one scan suffices and all further processing can occur in RAM. However, if data will not fit in RAM, one is forced to leave data on disk while the tree building process takes place.

Since data is disk resident, we never manipulate or move records around in the database. With each node in the decision tree classifier being constructed we need carry only a predicate that represents the associated set of records in the database. This predicate is fairly simple and is specified in a straightforward manner by the tree growing algorithm. Hence, splitting a node whose cases are in the databases simply consists of creating the predicates for the new children of that node. Splitting the records of a node is accomplished using statistical data (the sufficient statistics defined above) for the subset of records contained within a node. In a illustrative embodiment of this invention, the sufficient statistics has the form of a counts table. A counts table for a specified subset of the records is obtained by scanning the concerned records to build the counts. Since at any given time in the decision tree generation algorithm there may be many nodes requiring counts tables, the invention provides a method for building as many tables as possible with one scan of the database, hence minimizing the number of necessary database scans.

In order to optimize the number of scans of the database, a scheduler component of the invention schedules the data subsets (nodes in the decision tree being generated) for counting during the next database scan. Since the number of cases associated with a child node is always a subset of the set of cases at its parent, the number of records involved in the counting needed to process a child node decreases as the tree grows. At some point, it may become more efficient to perform an index scan of the data rather than a sequential scan that involves all records in the data table. When the scheduler component makes a determination that a particular subset of the data is better accessed via an index scan instead of as part of a sequential scan, it prepares and maintains a set of indices for all cases associated with the corresponding node in the decision tree.

As the number of records at some nodes decreases to the point where it is possible to fit the concerned subsets of the data in memory, the scheduler schedules the target nodes for a data-load mode of processing. Once a subset of the data is loaded into memory, the entire subtree below it is generated without requiring any interaction with the database. The invention admits three types of data processing and the scheduler component determines the mode of processing for each active node in the decision tree being generated.

The scheduler identifies a number of data subsets or nodes for evaluation on the next scan. It also determines what type of scan: sequential scan or index scan. Scanning of the records in the database produces sufficient statistics for each node. In a illustrative embodiment of this invention, the sufficient statistics are in the form of a counts table that is used for subsequent splitting of the data in that node. The number of nodes that can be evaluated during a sequential scan is determined based upon the memory requirements of the counts tables for the nodes and therefore varies from scan to scan.

When a scan of the database is completed, the counts table contains information from which the records in a node may be split. The counts table also contains the number of records within each node. This means that the scheduler can optimize a next scan by choosing to index or load records into memory from the data contained in a previous scan of the database.

In accordance with one embodiment of the invention, the counts table is organized into rows of discrete attribute values and columns of classifier attribute values. Where the attribute values are continuous, the rows are broken up into ranges. In accordance with this embodiment the record data contributes one count for each attribute. In accordance with an alternate embodiment of the invention, the rows of the counts table are formed by the conjunction of two or more attribute values. In general, counts can be collected for conjunctions of attribute values of width w, i.e. a combination of w attribute values would be counted for a given case. A counts table that counts all conjuncts of width w appearing in the cases constituting a node allows the decision tree building algorithm to expand w levels of the tree without scanning the data. Hence, by increasing the width parameter w, we can decrease the number of scans required to build a model.

The choice of how many attributes to combine into a single row is based on the size of a node under scrutiny, on the number of attribute value pairs appearing on that node, and on the preference of the user for minimizing database scan time in favor of keeping wider counts table. The combining of a number of attributes (say w1) amounts to a multi-level or multi-depth count table that enables the derivation of all counts table of width w2 where w2<w1 without rescanning data in the database.

While the presentation of this method is for an illustrative embodiment of this invention that uses w=1, the same methods, scans, and considerations can be used for any setting of the w parameter, including varying it during model building.

From the above it is seen that one object of the invention is a database analyzer having a scheduler that optimizes use of the computer's main memory (RAM) while performing the analysis to speed building of a classifier from the data in the database. These and other objects are advantages and features of the invention that will become better understood from a detailed description of a illustrative embodiment of the invention which is described in conjunction with the accompanying drawings.

DETAILED DESCRIPTION

Figure 1:
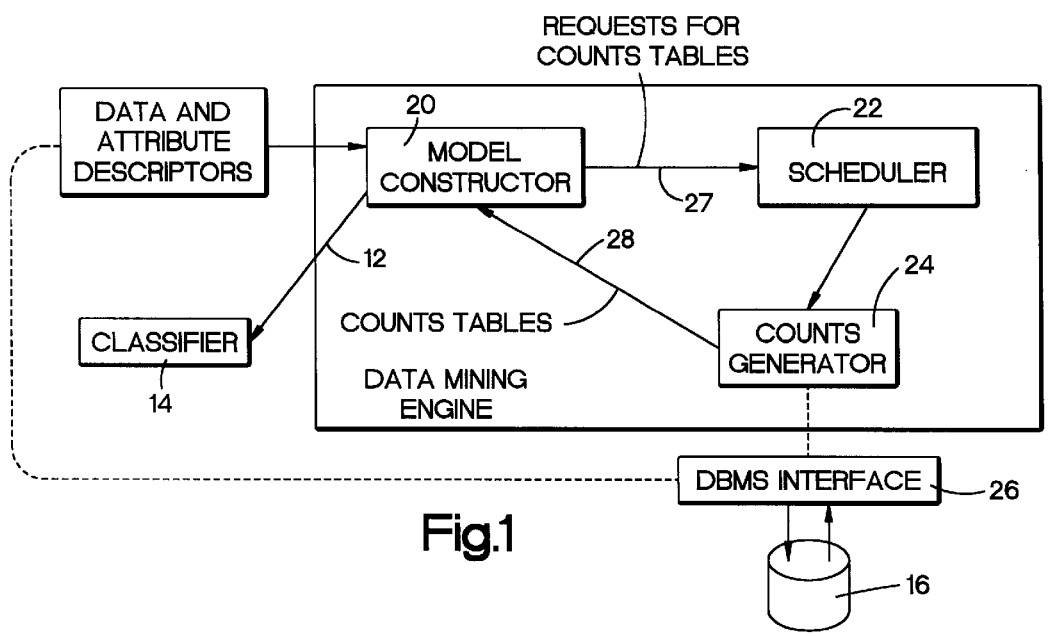
FIG. 1 is a schematic representation of a data mining engine used in building a classification model.

The present invention has particular application for use with databases made up of large sets of data. As seen in FIG. 1, a data mining engine 10 produces output data 12 to produce a classifier 14 characterizing the data from a database. The large set of data records that make up the database are stored on a storage medium 16. The data mining engine 10 is made up of software components that include a model constructor 20, a scheduler 22 and a counts generator 24. Each of these components is described in more detail below. Briefly, the model constructor 20 receives as input data the data and attribute descriptors of the data records stored within the database via a database management system interface 26. This information characterizes the data and in the illustrative embodiment of the invention allows the model generator to control the splitting of data within the database into subsets of data that will produce the classifier 14. The model constructor then makes a request 27 for the counts tables for these subsets. The scheduler 22 responds to the splitting of data by scheduling subsets of data for further evaluation and the counts generator 24 produces a counts table for each of the subsets of data and sends the counts table 28 back to the model constructor 20.

Figure 4:
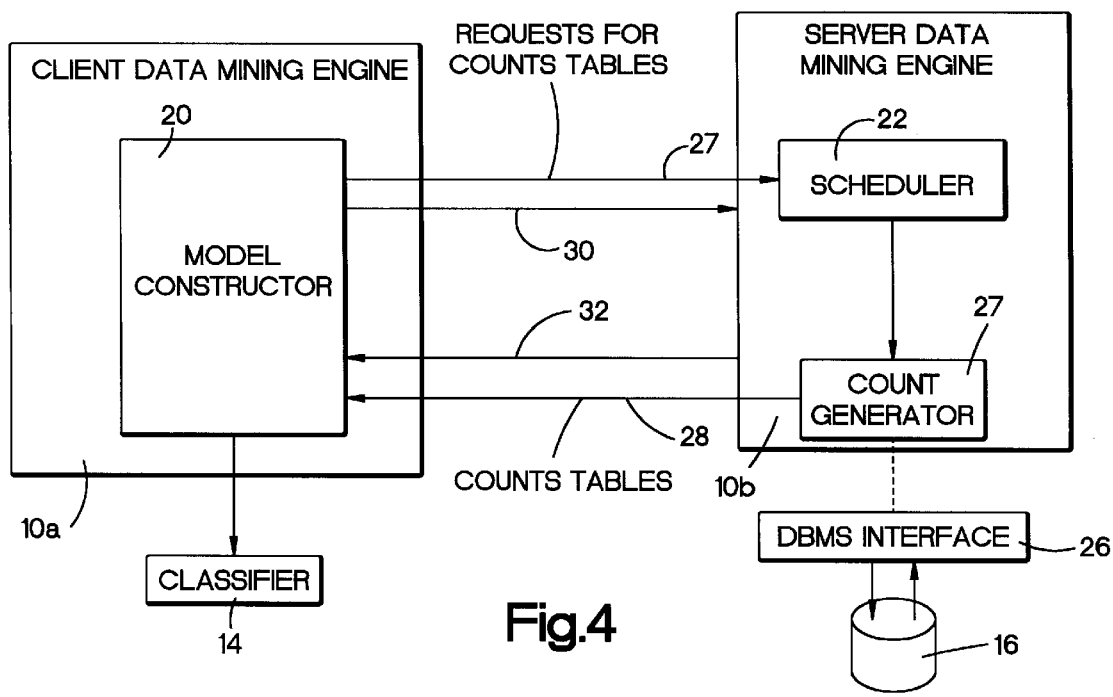
FIG. 4 is a schematic depiction of a client server depiction of the data mining engine of FIG. 1.

As seen in FIG. 4, the implementation of the model constructor function and scheduler and count generation functions can be allocated using the client-server model. In this model the client implements a first portion 10a of the data mining engine and the server implements a second portion 10b. The model constructor 20 is implemented by the client. As discussed above the model constructor 20 requires data characterizing the structure of the data and data attributes of the database. This information is requested from the server which gathers the data and sends it back to the model constructor 20. This two way data transfer is indicated by the arrows 30, 32 in FIG. 4.

The server implements the scheduler and counts generator components and interfaces with the database through the interface 26. The client-server implementation allows different model constructors to be substituted one for another and so long as they support the interfaces for requesting counts tables and receiving the counts tables back from the server.

Figure 2:
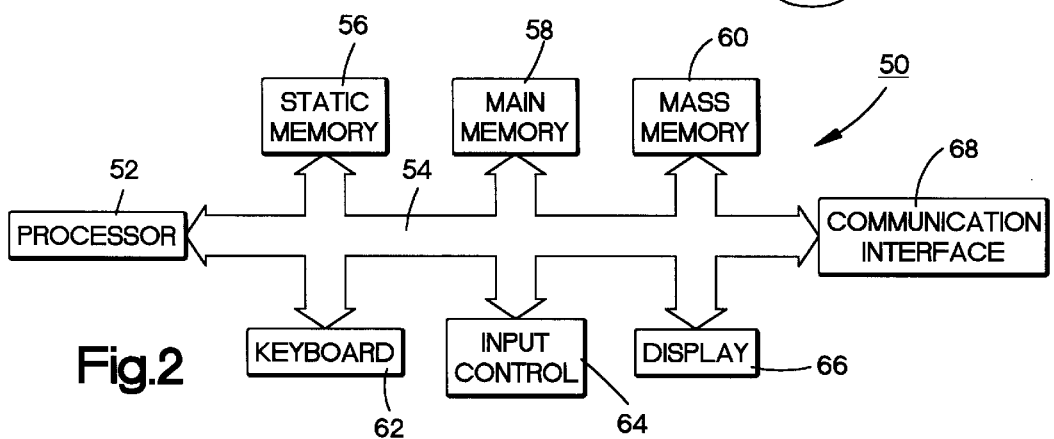
FIG. 2 is a schematic illustration of a computer system for using the data mining engine of FIG. 1.

A representative computer system 50 suitable for executing software for implementing the data mining engine 10 is schematically depicted in FIG. 2. The computer system has a processor 52, a system bus 54, a static memory 56, a main memory 58, a mass memory 60 that includes the data storage device 12 of FIG. 1. The system further includes a keyboard 62, a control device 64 for manipulating a cursor, and a display 66 such as a computer monitor. Depending on the operating system, a graphical user interface may be included for evaluating the database by means of the data mining engine 10.

The main memory 58 may comprise random access memory (RAM) or any other suitable memory device. The mass memory 60 may include one or more hard disk devices, a floppy disk, an optical disk, a flash memory device, a file server device, or any other suitable memory device. For this detailed description, the term memory comprises a single memory device and any combination of suitable memory devices for the storage of data and instructions. The system bus 54 is shown in FIG. 2 to be coupled to a communications interface 68 that provides for the transfer of digital information between the hardware devices of the computer system 50 and remote storage devices such as other computers on a network.

Figure 3A:
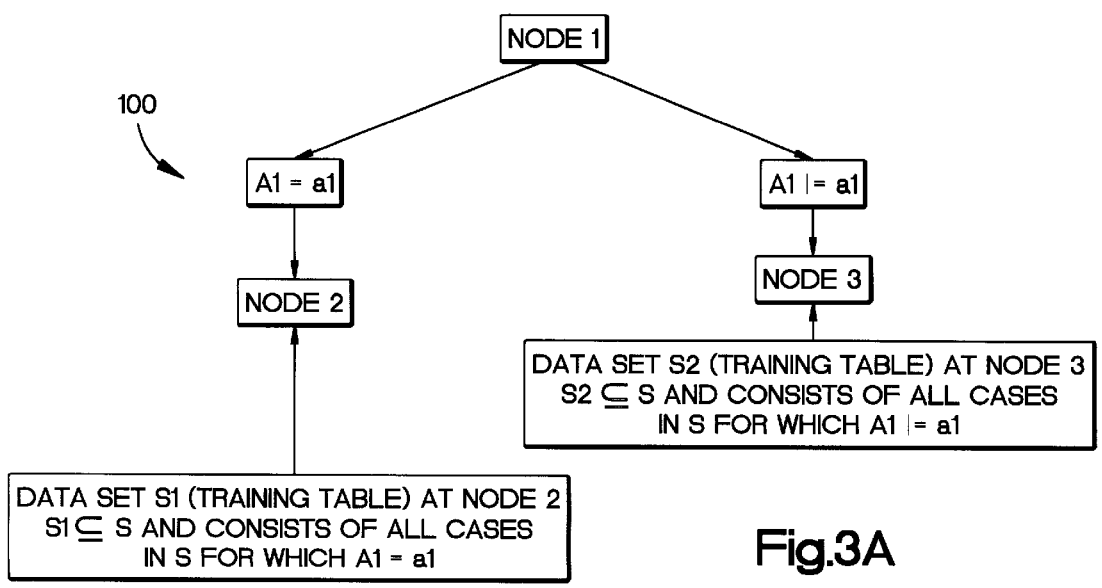
FIGS. 3A and 3B are examples of decision tree classifiers used in conjunction with practice of a illustrative embodiment of the present invention.

The illustrative model constructor 20 builds a decision tree. An example decision tree 100 for the records contained in Table 1 is shown in FIG. 3A. Three nodes of the tree have been depicted. The root node Node 1, contains all records of the data from Table 1. Each of the two non-leaf nodes Node 2, Node 3 on the tree are decision nodes that define branch predicates that specify a subset of the complete data set. Thus each child node has associated with it a set of records that are a subset of the records associated with the parent node. As discussed below in conjunction with the decision tree of FIG. 3B, each leaf node has associated with it a classification prediction: a prediction of what values of the class variable are to be found at the leaf. This prediction can be probabilistic, i.e. for each value of the class variable, an associated probability of that value is given. Hence classification is a vector of probabilities whose size is the number of values of the class.

The tree building process begins with a tree consisting of a single root node containing all the records. The data set at a node is examined and counted as shown in the Table 3 counts table below:

TABLE 3

| Counts Table | | | | | |
|---|---|---|---|---|---|
| Attr_ID | Attr_val | C1 | C2 | . . . | Ck |
| Attr_1 | v_11 | Cnt | Cnt | . . . | Cnt |
| Attr_1 | v_12 | Cnt | Cnt | . . . | Cnt |
|  | . . . | Cnt | Cnt | . . . | Cnt |
| Attr_1 | v_1r$_1$ | Cnt | Cnt | . . . | Cnt |
| Attr_2 | v_21 | | | | |
| Attr_2 | v_22 | | | | |
| Attr_2 | v_2r$_2$ | | | | |
| Attr_m | v_m1 | | | | |
| Attr_m | v_m2 | | | | |
|  | . . . | | | | |
| Attr_m | v_mr$_m$ | | | | |

The Table 3 counts table is organized with the first column as attribute names of Attr_1, . . . , Attr_m of the data of Table 1, the second column being the values of the corresponding attribute in column 1, and the next k columns being labeled with the values of the class variable (assumed to have k values). The class value columns contain counts. The count in each cell represents the number of times in the data (from Table 1) that the class value occurred along with the Attribute-value pair combination specified in the first two columns. We assume all attributes are discrete. If an attribute is numeric with a large number of values, we assume that its values were discretized in a preprocessing step of preparing the data in table 1 or that a discretization algorithm was run that reduced the values to a small set of intervals over the range of the attribute.

The Table 3 counts table is used to select which attribute to branch on from any node. Since each node in the tree has an associated data table in the form of the table shown in Table 1, it is possible to produce a counts table in the form of the table in Table 3.

Based on the counts table, it is possible to select a test (predicates) for generating the child nodes of a given node. As an example, we use the counts table in the attribute selection stage of the construction of a decision tree classification model. Decision trees can use many measures for selection, we'll use information entropy as a representative measure for purposes of illustration. To evaluate the information entropy of Class against Attr_1 as a splitting attribute, where one is to branch on all values of Attr_1: Let CV(1,j,i) be the entry in cell in row Attr_1 V_1j and column Ci $$\text{Let Sum}(1, j) = \sum_{i=1}^{k} CV(1, j, i)$$

$$\text{Let } N = \sum_{j=1}^{r_1} \text{Sum}(1, j)$$

$$\text{Entropy} = -\sum_{j=1}^{r_1} \frac{\text{Sum}(1, j)}{N} \left( \sum_{i=1}^{k} \frac{CV(1, j, i)}{\text{Sum}(1, j)} \log\left(\frac{CV(1, j, i)}{\text{Sum}(1, j)}\right) \right)$$

Similarly, many other impurity and statistical measures can be computed strictly from the values in the correlation counts table. For example, the conditional probability of an attribute value given the class is:

$$\text{Prob}(\text{Attr}\_1 = V\_1j | \text{Class} = Ci) = \frac{CV(1, j, i)}{\text{Sum}(1, j)}$$

Based on the results of applying a selection criterion (such as the example Entropy criterion provided above), tests are chosen where each test becomes a branch leading to a new child node. All cases at the current node are split to satisfy the test on the branch and are moved to the corresponding child. This process is illustrated in FIG. 3A where two tests are used to construct the two child nodes Node 2, Node 3.

From the counts table constructed for the root node Node 1, assume that the tests A1=a1 and Else are chosen. This creates two branches and two corresponding child nodes Node 2 and Node 3. The cases in the data set S1 are moved to the two subsets S1 and S2 as shown in the diagram.

The root node, Node 1, contains a set S containing all cases in the training data. The algorithms proceeds as described above growing subtrees under the root and its children. A stopping criterion decides when splitting on a node is to stop and hence that node would be turned into a leaf node. Many stopping criteria are possible and are given in the literature. Also note, as specified above, the set of tests associated with child nodes of any given node need not be mutually exclusive, although in most implementations of decision tree algorithms they are.

Figure 3B:
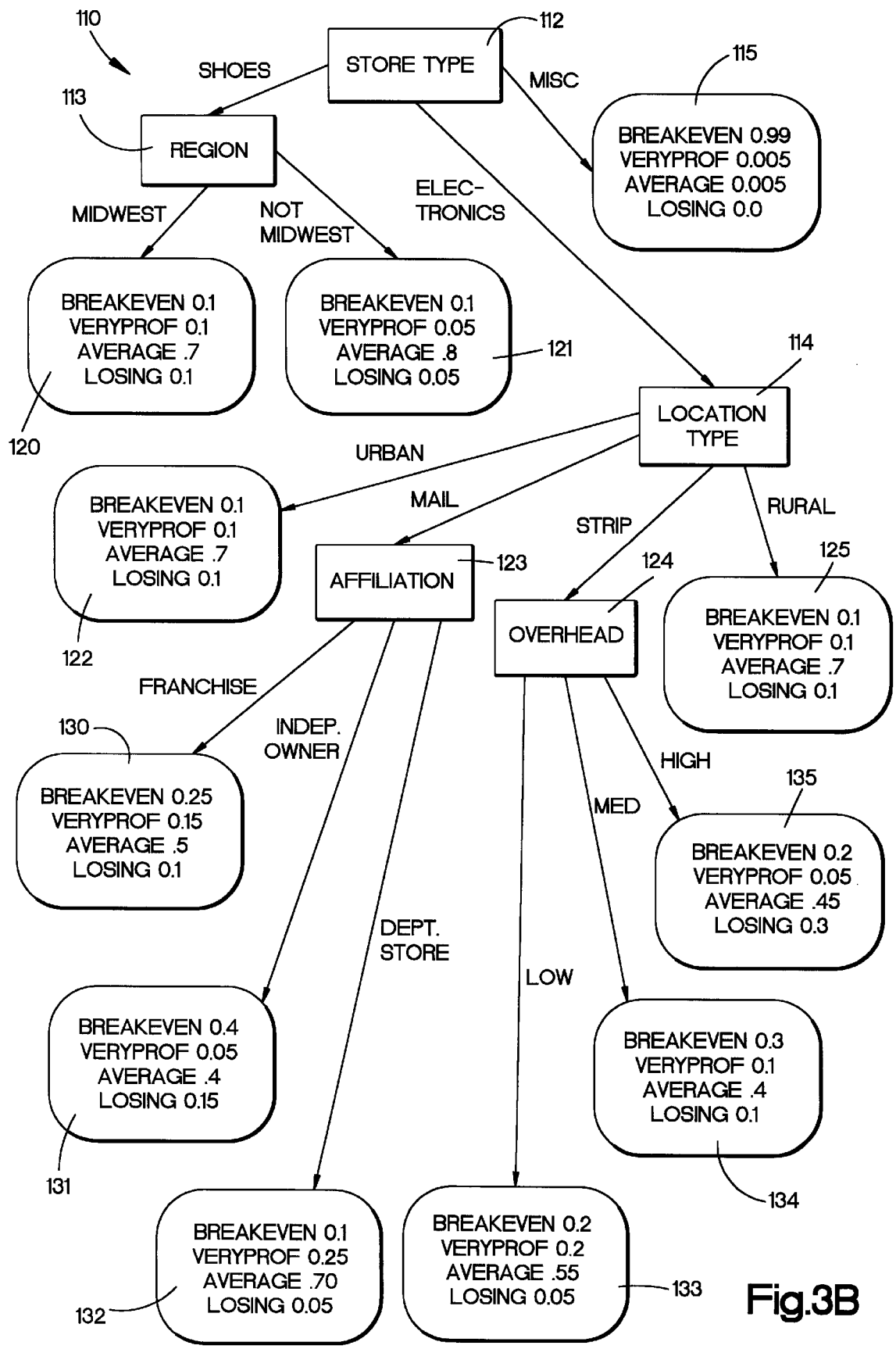

FIG. 3B is a sample decision tree 110 for the data contained in Table 2. The tree building process begins with a single node containing all database records. As scanning of the database records occurs, different combinations of attributes are encountered, and a count of the values of the attributes is maintained in a counts table that is stored in the computer system's main memory 58. Table 4 is a representative counts table for the retail store database. The value $C_{11A}$ represents a count of records wherein attribute 1 has an attribute value of v11 and a class value of 'Ave'.

TABLE 4

|  |  | Ave | Vprof | Losing | BEven |
|---|---|---|---|---|---|
| Attribute1 | v11 | $C_{11A}$ | $C_{11V}$ | $C_{11L}$ | $C_{11B}$ |
|  | v12 |  | ... |  |  |
|  | v13 |  | ... |  |  |
|  | ... |  | ... |  |  |
| Attribute2 | v21 |  | ... |  |  |
|  | v22 |  | ... |  |  |
|  | v23 |  | ... |  |  |
|  | ... |  |  |  |  |
| LocationType | StripMall | 55,000 | 12,000 | 13,000 | 75,000 |
|  | Rural | 10,000 | 0 | 35,000 | 41,000 |
|  | Urban | 25,000 | 5,000 | 20,000 | 55,000 |
|  | Mall | 90,000 | 40,000 | 30,000 | 65,000 |
| StoreType | Shoes | 25,000 | 15,000 | 25,000 | 30,000 |
|  | Electr | 25,000 | 20,000 | 30,000 | 40,000 |
|  | Misc | 250 | 250 | 0 | 30000 |
|  | ... | ... | ... | ... | ... |
| AttributeM | vM1 |  | ... |  |  |
|  | vM2 |  | ... |  |  |

Table 4 is also organized with the class variables as column headings and the attribute ranges of the various attributes that make up the records of the database as row designators. If the attributes are discrete values then there is a row in the counts table for each discrete value. If the attributes are continuous, then the rows are set up to divide the continuous possible values into ranges. In the illustrated counts table the 'Location Type' has only four discrete values, i.e. StripMall, Rural, Urban, and Mall. The store type attribute 'StoreType' has the three discrete values that are listed, i.e. Electronics (Electr), Misc, and Shoes as well as other store types not explicitly listed in the table. Each record contributes a count to the counts table under one of the class headings for each of its m attributes. For each value of the attribute LocationType and for each value of the Class variable (Profitable) a count of the number of cases in the data subset under consideration (node in the tree) is recorded. A case contributes to the count of LocationType=Mall and Profitable=VProfitable if it has those two values for the two attributes. The total number of entries in the counts table for a given attribute, LocationType, for example is equal to the total number of entries in the counts table so long as null entries are not allowed in the original table.

A illustrative embodiment of the present invention uses a decision tree to build the classification model. Each non-leaf node on the decision tree is a decision node that defines a branch predicate. Each decision node has associated with it a set of records that are a subset of the records associated with the parent node.

Turning to FIG. 3B, note that the process of building a tree starts with a root node 112. Associated with each node is a set of records. In the case of the root node 112, the set of records is the entire database. The model classifier 20 (FIG. 1) splits the dataset of a given node into branch nodes based upon a classification criteria. Assume that there are only three values for the attribute 'Storetype' in the database represented by the counts table of Table 4. The root node 112 of FIG. 3B splits between the three attribute values of 'Electronics', 'Shoes', and 'Misc'. Each of the three child nodes 113, 114, 115 has a data set associated with it and this data set is processed by the step of creating a counts table and then using the counts table to split the node again into further branch nodes.

Each leaf node has associated with it a classification prediction, i.e. a prediction of what values of the class variable are to be found at the leaf. In FIG. 3B this prediction is probabilistic, i.e. for each value of the 'profitability' class variable displayed in each leaf node, an associated probability of that value is given. Thus, in FIG. 3B a leaf node 115 has probabilities of 'BreakEven=0.99', 'VeryProf'=0.005 etc. The classifier is completed when all nodes in the decision tree are leaf nodes.

FIGS. 5, 6A, 6B and 7 are flowcharts that summarize the tree building process for such a database.

Tree Building Flowchart

Figure 5:
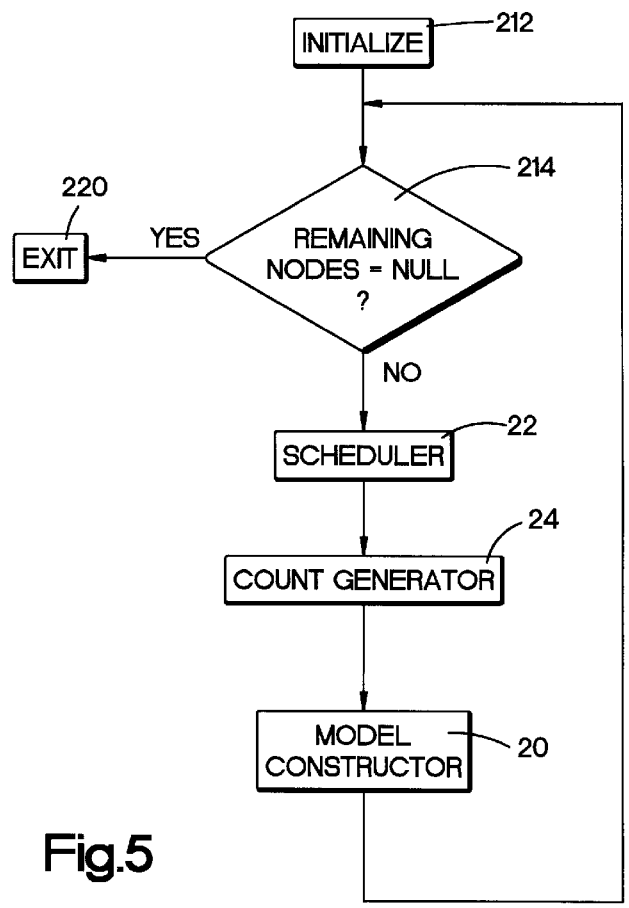
FIG. 5 is a flow chart depicting a manner in which a data mining engine constructed in accordance with the invention builds decision trees such are the decision trees of FIGS. 3A and 3B.

FIG. 5 illustrates the steps of identifying remaining nodes of the tree wherein any node is designated as a 'remaining node' so long as it is not a leaf. As long as there are remaining non-leaf nodes, the model classifier 20 calls the scheduler 22 that schedules nodes for expansion. The counts generator responds to a request from the scheduler 22 and builds counts tables for those nodes and returns the counts tables to the model constructor 20 that splits the nodes using the contents of the counts tables. The model constructor 20 also identifies leaf nodes and maintains a list of predicates that define the branches leading to the leaf nodes. The FIG. 5 flowchart shows a processing loop but if the entire database will fit in memory the loop ends with one iteration and the model constructor 20 completely classifies the database.

An initialization step 212 for the FIG. 5 flowchart sets up data structures for storing data characterizing the nodes or data subsets of the tree such as the tree 110 of FIG. 3B. When there is only one node in the tree, there is one remaining_node (and only one) so assuming the records of the database will not fit in memory, the initialization step 212 adds the root node to the list of remaining nodes.

A variable designated 'remaining_nodes' contains two 'sublists' of non-leaf nodes that are used by the scheduler 22. These two node sublists are designated 'to_be_processed_by_scan' and 'to_be_processed_in_memory'. The nodes on the first sublist are processed during a scan of the database and the nodes on the second sublist are designated for processing by loading the data from those nodes into the main memory 58 of the computer for in-memory classification.

After the initialization step, the model constructor 20 performs a test 214 to see if the variable 'remaining_nodes' is zero. If the number of non-leaf nodes is zero, the analysis of the database is complete and the model constructor exits 220. If there are remaining nodes on the list, the scheduler 22 is called to process the remaining nodes in accord with the processing steps of FIGS. 6A and 6B. When completed, the model constructor produces an output classifier 14 that is defined or characterized by the predicates or decision branches of all non-leaf nodes in the tree 110 and a list of probabilities of the class variables for the leaf nodes.

Figure 6A:
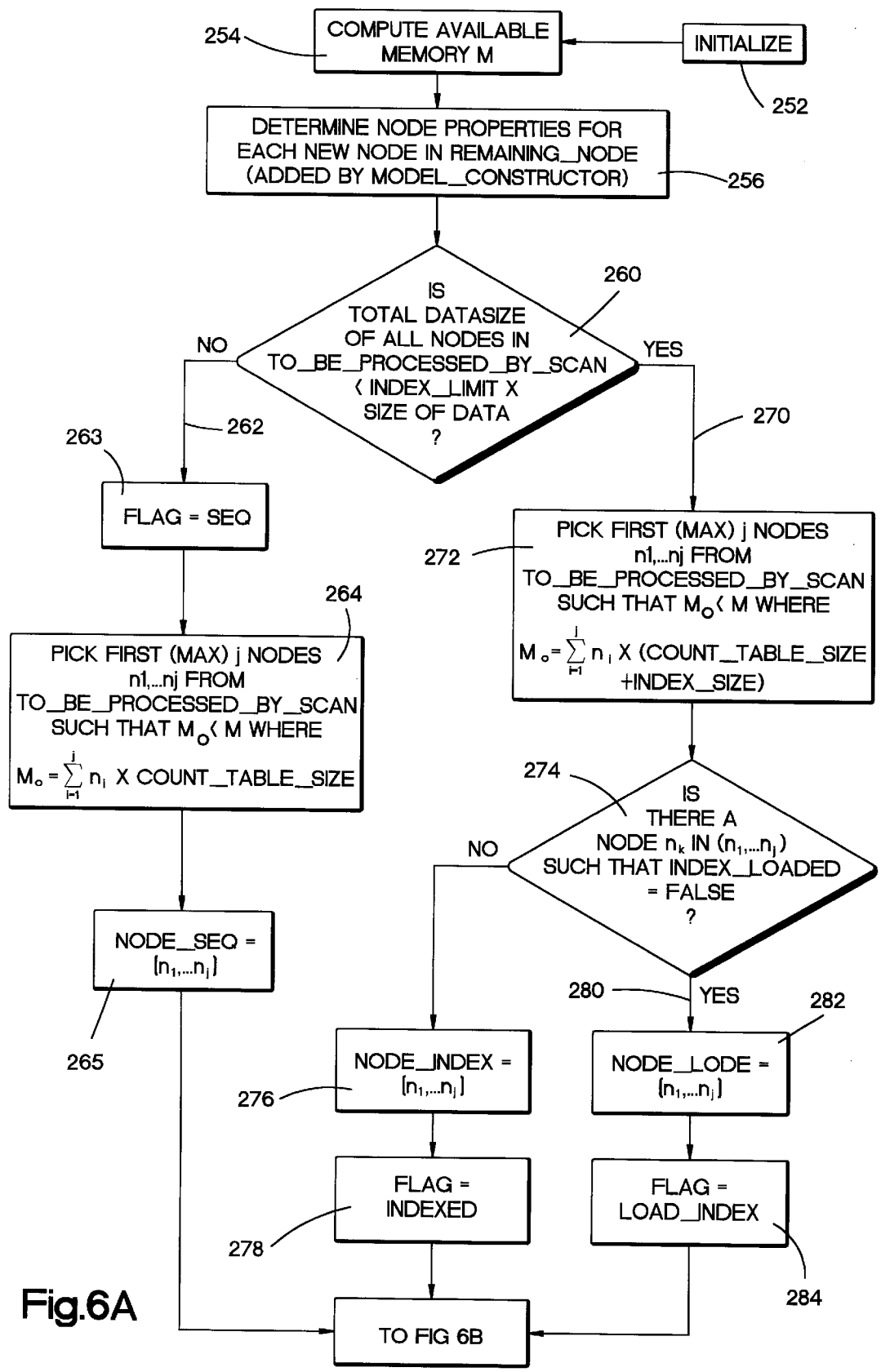
FIGS. 6A and 6B are flowcharts of a scheduler having an optimizer for use in building a decision tree such as the decision trees depicted in FIGS. 3A and 3B.
Figure 6B:
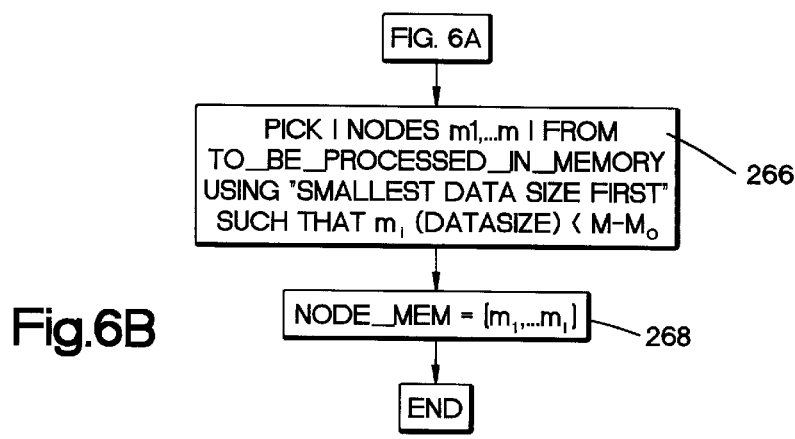
Figure 7:
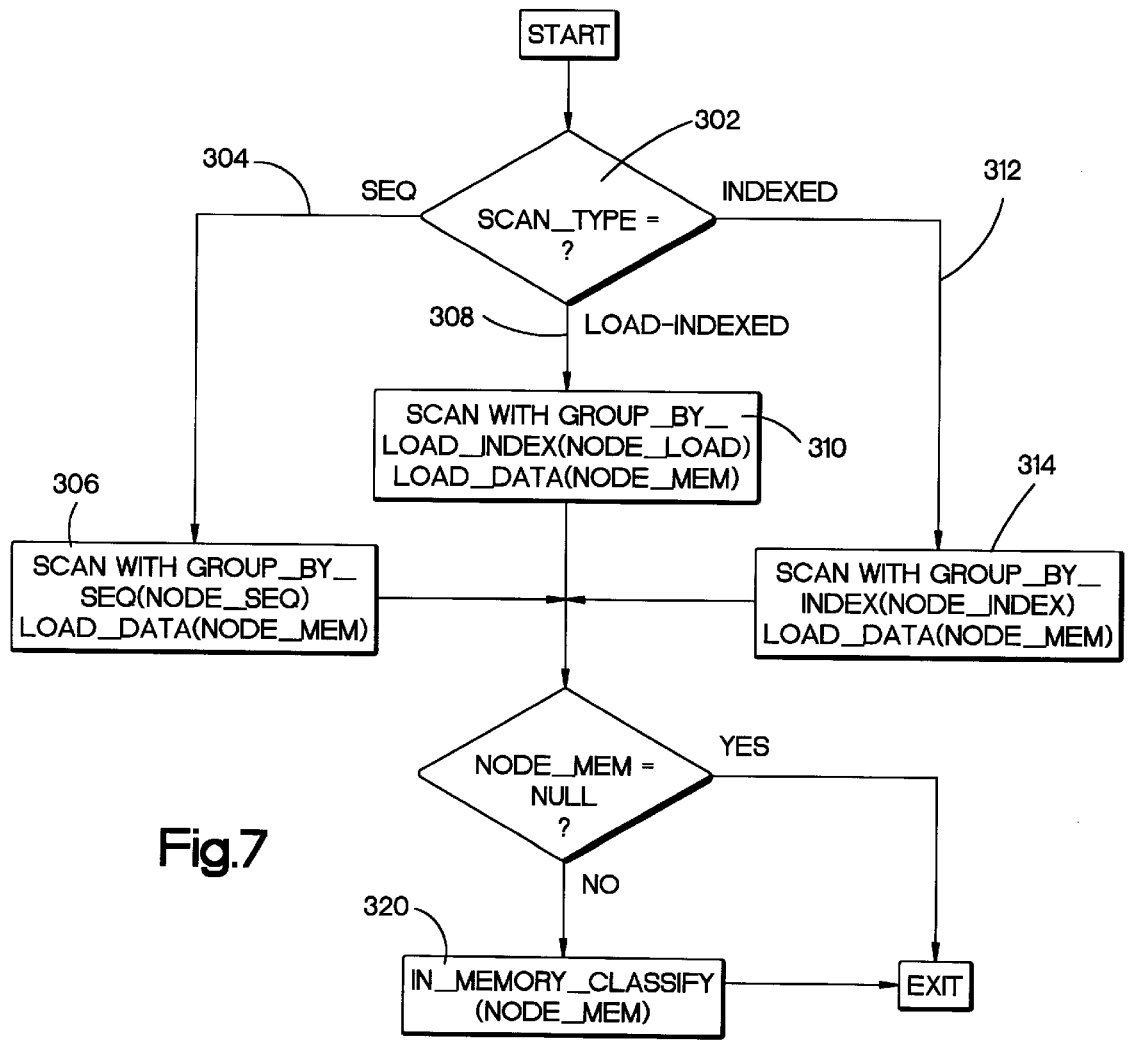
FIG. 7 is a flowchart of a process of generating a counts table based upon a most efficient means of accessing the data that depends upon a stage reached in the decision tree building process.

Scheduler 22 FIGS. 6A and 6B

The scheduler component 22 of the data mining engine 10 is depicted in the flow chart of FIGS. 6A and 6B. Data subsets (nodes in the decision tree being generated) are scheduled for counting during the next database scan. The invention admits three types of record processing; sequential scanning of all records, indexed scanning of certain records, and in-memory classification of records. Since the number of cases or records associated with a child node is always a subset of the set of cases at its parent, the number of records involved in the counting needed to process a child node decreases as the tree grows. At some point, it becomes more efficient to perform an index scan of the data rather than a sequential scan that involves all records in the data table. When the scheduler component makes a determination that a particular subset of the data is better accessed via an index scan instead of as part of a sequential scan, it prepares and maintains a set of indices for all cases or records associated with the corresponding node in the decision tree.

As the number of records at some nodes decreases further to the point where it is possible to fit the concerned subsets of the data records in rapid access memory such as the computer's main memory 58, the scheduler 22 schedules the target nodes for a data-load mode of processing. Once a subset of the data is loaded into memory, the entire subtree below it is generated without requiring any data access from the database store 16. The scheduler component determines the mode of processing for each active node in the decision tree being generated.

To make its determination of the manner of record evaluation, the scheduler 22 maintains information and counts tables concerning each node. An indication of the size of the data in a node is maintained in a 'datasize' variable. A node's data size is related to the number of records associated with that node. A related variable is called 'indexsize' and is an indication of how much memory an index for the data associated with that node would require. A Boolean variable called 'index_loaded' is an indication of whether an index of the records of a node has been loaded into memory. An additional variable called 'count_table_size' is an indication of the size of the count table for the node.

Unless the entire table will fit in memory, in which case an in-memory classification of the entire table is performed, the first scan of the database is sequential or 'seq' for short. As the decision tree is created, the scheduler can change the scan type variable from 'seq' to two other types of scan, 1) load_indexed and 2) indexed. A load_indexed scan is a sequential scan that loads the record indices for specified nodes. An indexed scan is an indexed scan where the data associated with a node is visited by indexed access. Additionally, during a scan of the database, the scheduler 22 designates nodes for loading into memory on the 'to_be_processed_in-memory' sublist of remaining nodes.

The scheduler 22 maintains a few additional global variables. A variable 'max_datasize' is a limit on the amount of data a node can contain and still be loaded into memory for in memory classification. A second global variable, 'index_limit' is a fraction of the entire database size and is used to determine when indexed access of the data is to be performed. A third global variable, 'global_mem' is the memory available for the classifier and is also referred to as M.

The scheduler 22 performs an initialization step 252 (FIG. 6A) that sets up four null or empty node lists. A first node list 'node_seq' is a list of nodes to be evaluated during a sequential scan of the database. A second list, 'node_load' is a list of nodes for which indexes should be loaded during a sequential scan of the database. A third list, 'node_index' is a lists of nodes that have already had an index loaded into memory during a previous sequential scan. Only one (or zero) of these first three node lists can contain a list of nodes at a given time. The fourth node list is designated 'node_mem' and is a list of nodes for which the records are to be processed in memory during the current scan.

Nodes that can be scheduled by the scheduler 22 are subject to the restrictions of the available memory of the computer system. After the initialization step 252 the scheduler 22 determines 254 the amount of memory M of the computer that is available to it.

The scheduler next determines 256 the node properties of all nodes on the remaining node list. This step corresponds to setting the properties (datasize etc) for each remaining node as well as placing each node on one of two sublists, i.e. the 'to_be_processed_by_scan' list or the 'to_be_processed_in memory' list.

At a decision step 260 the scheduler 22 determines if an indexed evaluation of the remaining nodes is desirable. The scheduler determines the total data size in the sublist 'to_be_processed_by_scan' sublist and compares that data with a factor or fraction of the total size of the database. In a illustrative embodiment of the invention the factor 'index_limit' is chosen to be 10%. Note, as nodes are processed, eventually the data for certain nodes is loaded into memory for an in-memory classification and this data is associated with one or more leaf nodes. Even before the in-memory classification, a dataset can be designated as a leaf node based on the count table and splitting of its parent node. As leaf nodes are identified, the amount of data associated with the nodes on the 'to_be_processed_by_scan' sublist is reduced until indexed classification becomes possible.

Initially, before leaf nodes have been identified, a negative branch 262 is taken and the type of scan is set 263 to 'seq' to indicate a sequential scan is to be performed. For a sequential scan, the scheduler 22 chooses nodes for evaluation at a step 264 based upon the number of counts tables that can fit in memory. Recall that the size of a counts table for a node is calculated to be 'count_table_size'. The scheduler 22 picks the first j nodes from the sublist 'to_be_processed_by_scan' where the combined size of the counts table for those j nodes is less than M the amount of memory available for use by the scheduler. These nodes are added 265 to the node_seq list.

The scheduler 22 next branches to the FIG. 6B portion of the flowchart to determine the nodes that will fit in memory. At a step 266, the scheduler chooses 1 nodes, starting with the smallest data size nodes first, from the sublist 'to_be_processed_in_memory' (identified at step 256) such that the size of data contained in those 1 nodes is less than the amount of available memory M less the amount of memory taken up in storing the counts tables for the j nodes from the 'to_be_processed_by_scan' sublist at step 264. Note that since the scheduler determines $M_0$, the amount of memory needed by the counts table (and as seen below, possibly indexing), the number of nodes that can be loaded into memory is dependent on the number of nodes for whom counts tables are to be generated. The scheduler adds 268 these 1 nodes to the 'node_mem' list and returns to the main classifier loop of FIG. 5.

Returning to the branching decision 260 in FIG. 6A, the 'yes' branch 270 is taken when indexing of records is to be performed. At a step 272 a number j of the to_be_processed_by_scan sublist is selected such that the indexing requirements for those j nodes plus the size of the counts tables for those nodes fits into the memory M available for use by the scheduler. The scheduler next determines 274 if all j nodes identified during the step 272 have indexes loaded. If the indexes have been loaded for all j nodes, these nodes are added to the list 'node_index' and the scan flag is set 278 to 'indexed' meaning indexed access of records for these nodes is possible and will be used when accessing records during counts table generation.

If not all j nodes are indexed, a branch 280 causes the scheduler to add 282 the j nodes to the list 'node_load' and the scan flag is set 284 to 'load_index'. This causes the indices for the j nodes to be loaded during a next sequential 'load_indexed' scan. Following the branch 270 where either an 'indexed' or 'load-index' scan is scheduled, the scheduler 250 branches to determine data to be loaded into memory on the node-mem list.

Counts Generator

A count generation component 24 called upon return from the scheduler 22. The generate count component 24 begins by determining 302 the type of scan. Regardless of the type of scan, nodes on the node_mem list are loaded into memory during the scan. If the scan type is 'seq' a branch 304 causes a sequential scan 306 and counts tables to be built for all nodes on the list 'node_seq'. If the scan type is Load-indexed, a branch 308 is taken. A sequential scan occurs while indexes for the nodes on the 'node_load' list are loaded into memory at a step 310. A count table for these nodes is also created. Finally if the scan type is indexed a branch 312 is taken. Indexes for the nodes on the list 'node_index' has already been loaded into memory and counts tables for these nodes are generated 314 by indexed access of the records that make up these nodes. If any of the three scan steps 306, 310, 314 has caused data associated with nodes to be loaded into memory, an in memory classify 320 of the nodes on the list 'node_mem' is performed.

Model Constructor

Upon return to the main processing loop of FIG. 5, the control returns to the model constructor component 20. This component uses the counts from the counts table built during one of the scan steps 306, 310, or 314 to split the nodes into other nodes as well as declaring nodes to be leaf nodes with the class probabilities assigned to the leaf nodes. When the model constructor 20 identifies a leaf node, that node is removed from the remaining nodes list so that the next invocation of the scheduler need not deal with data associated with that leaf.

EXAMPLE

Consider the example of the decision tree 110 shown in FIG. 3B which is based upon the subset of data in table 4 for the StoreType attribute values 'Shoes', 'Electronics', and 'Misc'. Initially, there is one node, the root node 112. When the scheduler is called, at the step 256, the root node is added to the sublist 'to_be_processed_by_scan' and the branch 262 taken so the scan flag is set 263 to 'seq'. There are no nodes that will fit in memory so the count table, Table 4 for the root node is built at the step 306. The model constructor 20 then splits the root node 110 into three child nodes 113, 114, 115 based on the three values of the 'StoreType' splitting criteria.

Assume at the step 256 on the second iteration through the classifier, the scheduler 22 determines that the node 115 has a number of records that cause the node to have a 'datasize' less than the global variable 'max_datasize'. This means the sublist 'to_be_processed_by_scan' has two nodes 113, 114 and the sublist 'to_be_processed_in_memory' has the node 115. The branch 262 is again taken and the scan type is sequential. With only two nodes on the sublist 'to_be_processed_by_scan' there is enough memory $M-M_0$ to load the data associated with the node 115 into memory and this is done. When the in-memory classify is done at the step 320 the node 115 is fully evaluated and the probabilities seen in FIG. 3B assigned to that node.

The model constructor 20 gets counts tables for the two nodes 113, 114 and splits the node 113 based upon the 'region' attribute and splits the node 114 based on the 'location_type' attribute. Six nodes 120–125 are evaluated at the step 256 of the scheduler 22. Four nodes 120, 121, 123, and 124 are added to the 'to_be_processed_by_scan' sublist and two nodes 122, 125 are added to the 'to_be_proccessed_in_memory' sublist. At the decision step 260 it is determined that the data for the nodes 120, 121, 123, 124 is greater than the index_limit factor and the branch 262 taken. It is determined that the counts tables for all the nodes 120, 121, 123, and 124 can be fit into memory at the step 264. At the step 266 it is determined that only one node 125 should be add to the 'node_mem' list so that the data for the node 122 is not loaded. Counts tables for the nodes 120, 121, 123, and 124 are created and the data for the nodes 125 is loaded. The node 122 remains on the 'to_be_processed_in_memory' list. At the step 320 an in-memory classify for the node 125 is performed.

Assume that the model constructor determines based on the counts tables for the two nodes 120, 121 that they should be leaf nodes and removes them from the remaining nodes list. This leaves three nodes 122, 123, 124 on the remaining nodes list and the node 122 is on the 'to_be_processed_in_memory' list. Removal of the nodes 120, 121 from consideration causes the decision 260 to take the branch 270 since the data from the nodes 123, 124 is less than the factor 'index_limit'. This means that the number of electronics stores located in either a mall or a stripmall is less than 10% of the number of records having the three attribute values of 'Electronics', 'Shoes', and 'Misc'.

At the decision 272 both nodes 123, 124 are identified since the counts table for these nodes plus their indexes takes less memory than the memory cutoff M. No indexes have been loaded so at the step 274 a branch 280 is taken and the two nodes 123, 124 are added to the list 'node_load' and at the scan type is set at the step 282 to 'load_index'. The records from the node 122 can be loaded into memory is determined at the step 266, but it is also determined that the records associated with the node 124 (Seen below, table 5, to be 6000) is also small enough to be loaded into memory.

On the next scan (FIG. 7) a branch 308 is taken at the decision step 302 and the indexes are loaded for the nodes 123, 124 and counts tables are created for these nodes 123, 124. Additionally the data is loaded for the node 122 as well as the node 124. An in-memory classification is performed on the records associated with these nodes at the step 320. The in-memory classification of the records of the node 124 results in the building of three leaf nodes 133, 134, 135. The model constructor 20 uses the counts tables for only the node 123 to identify a split based on 'owner affiliation' into three nodes 130, 131, 132. The data for the 'ranges of overhead' was evaluated during the in memory classification step.

In general, some of the nodes 130–132 on the remaining nodes list may be small enough for in-memory classification and some may not. The data for these three nodes is indexed, however, so that if in memory classificaiton is possible the data is loaded into memory using the index. Assume all three nodes 130–132 are too large to fit in memory but that at the step 272 it is determined the counts tables will fit for them all. At the step 274 since all records for these nodes are already indexed, these nodes are added to the 'node_index' list and the scan type is set to 'indexed' at the step 278. There are no nodes on the 'node_mem' list so at the step 302 a branch 312 is taken and the counts tables created for the three nodes 130–132 by indexed access of the records that make up these nodes. As in the case of sequential scanning the data is visited but not loaded during creation of these counts tables. Assume the nodes 130–132 are identified as leaf nodes by the model constructor 20. This means there are no nodes on the remaining nodes list and a branch is taken at the step 214 since the tree building process has been completed. Variation The process constructed in accordance with a illustrative embodiment of the invention either builds a counts table or loads data into memory for each node of the decision tree 110. An alternative to this process is to construct the counts table not just for atomic conditions wherein an attribute contains a specified value such as attribute Attr_j=v_j but for conditions that are conjunctions of multiple such atomic conditions.

In particular, one can cause the building of counts tables of varying width on a node by node basis. Denote by C(w) the size of a count table of width w where the width is a number of attributes. For example, entries in a table that has width w=2 consist of counts of the class variable against conjunctions involving exactly two attributes. If the mining algorithm is provided with a counts table of width w, then it can derive all counts for combinations of w'<w attributes by summing (marginalizing) over the attributes that are not needed in the combination. This means that the mining algorithm need not revisit the data until it needs information that require combinations of more than w attributes. As an example, in the decision tree generation algorithm presented in this invention, if at the root node of the tree we request a counts table of width w=3, the algorithm can generate 3 full levels of the tree without making any additional requests to the database. Hence the number of database scans can be significantly reduce. However, since counts table of increasing width w increase in size significantly with w, constructing width w>1 would require more memory to hold the counts. Assuming a sparse representation of the counts table, then setting w=m the number of attributes translates roughly to loading the entire database (except that identical cases in the database are not stored in duplicate in the table but only counted).

One can design the scheduler 22 to vary this width factor w based on differing criteria. Alternate variations on the optimizer that utilize the width in different ways:

Optimizer Variation A:

Based on available memory fix w to be the max w which can fit in the available memory. The size of a counts table of width w can be upper bounded by the maximum number of possible combinations of width w (this is a safe over estimate) by taking the product of the number of values of the w attributes that have the largest number of values. Once this cost is estimated, it can be fixed and used by the optimizer without any further changes. Hence, other than changing the cost estimate of the counts table at the start, the same flowcharts specify the algorithm.

Optimizer Variation B:

This variation keeps the optimizer identically the same in the flow charts presented above except for an additional step. The optimizer decides which nodes are to be processed. Before starting the database scan, the optimizer checks to see how much memory is left unused. It then picks from the list of nodes to be counted the node that has the largest number of cases in the database associated with it. It then computes the largest w that can be accommodated for this node and we build the counts table with the largest possible w for that node. This does not change the behavior of the algorithm except that the decision tree growing algorithm will now be able to expand that particular node by w levels instead of just 1 level. The same cost estimate given in variation A is used to upper bound the size of the table with width w. The same flowcharts provided would still work except for one additional stage that chooses the largest node and the largest w after the optimizer makes its decision.

Optimizer Variation C:

In this variation the scheduler processes nodes in decreasing size of their data sets. The width w is chosen so that C(w), the size of the count table approximately equals the amount of the computer's main memory available for in-memory classification. This strategy is a depth first strategy since instead of causing a set of nodes in the tree to be expanded by 1 level, it causes a single node to be grown by multiple levels. Note that this is particularly appropriate at the root node of the tree since there would be only one node to be expanded.

The algorithm for this variation would work as follows: choose the node with the largest set of cases in the database, select the largest w that can be accomodated in RAM (based on available memory parameter M) and build a counts table of width w for only that node. Hence the optimizer selects one node at a time, except in cases where memory allows choice of more than one node in which case the optimizer chooses a second node with the next largest number of cases and maximizes the choice of w for this second node. It is assumed that the data mining algorithm is prepared to consume the w width table by expanding the decision tree w levels and augmenting all the descendant leaves (if appropriate) onto the list of nodes to be processed.

The modified counts table (designated Counts Table 5) see below illustrates the situation where a row designator for the counts table is the conjunction of two (w=2) attributes, StoreType and LocationType for the database of table 2. Only one of the classifier headings VProf is listed in this table.

TABLE 5

|  | Counts | | | |
|---|---|---|---|---|
|  | Vprof | ... | ... | ... |
| (Elec AND Mall) | 12,000 | | | |
| (Elect AND Urban) | 2,000 | | | |
| (Elec AND StripMall) | 6,000 | | | |
| (Elec AND Rural) | 0 | | | |
| (Misc AND Mall) | 100 | | | |
| (Misc AND Urban) | 100 | | | |
| (Misc AND StripMall) | 50 | | | |
| (Misc AND Rural) | 0 | | | |
| (Shoes AND Mall) | 8,000 | | | |
| (Shoes AND Urban) | 2,000 | | | |
| (Shoes AND StripMall) | 5,000 | | | |
| (Shoes AND Rural) | 0 | | | |
| (. . . ANDMall) | ... | | | |
| (. . . AND Urban) | ... | | | |
| ... | | | | |

The values in the table will count the co-occurrence of every conjunction of width 2 each of the values of the class values Vprof, Ave, Losing, and BEven. Even though table 5 only shows combinations involving the two attributes StoreType and LocationType, in fact all conjuncts of size 2 involving all other attributes in the data are also counted. Note, that the number of rows in Counts Table 5 is bounded by the number of combinations that actually appear in the data but that this is typically much smaller than the theoretical maximum which is exponential in the number of attribute values. In fact, when w=m, this number is achieved by the number of records in the node, hence when w=m the process behaves exactly as the loading of data into memory for in-memory classification.

The variation is a generalization of the above described in the flow charts of FIGS. 5, 6A, 6B and 7 since that process by default builds tables with w=1 except when the records for a particular node will fit into memory. For in-memory classification w=m where m is the total number of active attributes (those attributes being considered as split candidates) of the records in the node. The variation allows the scheduler to choose a value for w somewhere between the extremes of w=1 and w=m and evaluate multiple levels of nodes on a single scan. The difference is that only one node is expanded.

Modifications to the flowchart in the general cases of w between 1 and m are apparent to those skilled in the database programming art. The routine is still controlled by the identification and size of nodes. A counts table for two nodes at different levels such as the nodes 112, 114 in FIG. 3B can be formed with one scan.

The present invention has been described with a degree of particularity. Classification schemes that do not use tree classification are possible. Alternative to such a classifier are learning classification rules from data, learning expert systems for classification from data, and learning probabilistic classification models from data. It is accordingly the intention that the invention include all alterations and modifications from the disclosed design falling within the spirit or scope of the appended claims.

What is claimed is:

1. A method of building a data classifier from data stored on a storage medium using a computer having a rapid access memory comprising the steps of:
   a) storing a database of data records on a storage medium;
   b) sequentially scanning records in the database one or more times to build a classifier based on data contained within the data records;
   c) subsequent to at least one sequential scan of the records in the database, splitting the data records into nodes representing data record subsets for classification wherein the choice of data splitting is based on sufficient statistics extracted from the one sequential scan;
   d) prior to additional sequential scans of the records in the database, scheduling records of one or more identified nodes for indexed access from the storage medium; and
   e) during a next sequential scan of the records creating the index for accessing the records of said identified nodes from the storage medium for further classification of records in the identified nodes.

2. The method of claim 1 wherein each sequential scan of the database evaluates a new set of nodes different from a previous set of nodes wherein the new set of nodes is based upon a splitting of the records in the database.

3. The method of claim 1 including the step of comparing a specified portion of the computer's rapid access memory with the amount of rapid access memory needed to load records from a specified node into the computer's rapid access memory for in-memory classification of the records within said specified node.

4. The method of claim 1 wherein the specified nodes are scheduled for indexed access of records from the storage medium by gathering of keys for the records within the specified nodes.

5. The method of claim 1 wherein prior to a sequential scan of the records in the database specified nodes are scheduled for loading into the rapid access memory to enable in-memory classification.

6. The method of claim 1 wherein the specified nodes are scheduled based upon the size of rapid access memory available for storing a sufficient statistics for each node that is evaluated during the sequential scan of the database.

7. The method of claim 1 wherein the database is classified into nodes of data records wherein each node contains a subset of the records in the entire database of records and wherein each sequential scan of the database identifies records of certain nodes for either in memory evaluation or indexed access of the records belonging to said certain nodes.

8. A method of evaluating a database stored on a storage medium using a computer having a rapid access memory comprising the steps of:
   a) storing a database of records having multiple attributes or fields per record on a storage medium;

b) sequentially scanning records in the database a first time to obtain sufficient statistics based on the contents of the records; said sufficient statistics determined by counting the occurrences of one or more classifier fields for attributes and attribute values;

c) using the results of the count of said occurrences to partly define a classifier model of the database for use in predicting the one or more classifier field; and d) continuing to build the classifier model by again sequentially scanning data records in the database and either i) bringing a subset of records from the database into the rapid access memory for using in further building of the classifier model or ii) building an index into the database for retrieval of data records from the database during the further building of the classifier model.

9. The method of claim 8 wherein the results of the statistical count are used to identify subsets of data in the database that are brought into the rapid access memory or for whom the index into the database is created.

* * * * *